Jan. 14, 1930.  B. GOULD  1,743,271
ELECTRIC MIXER
Filed Sept. 20, 1928   2 Sheets-Sheet 1
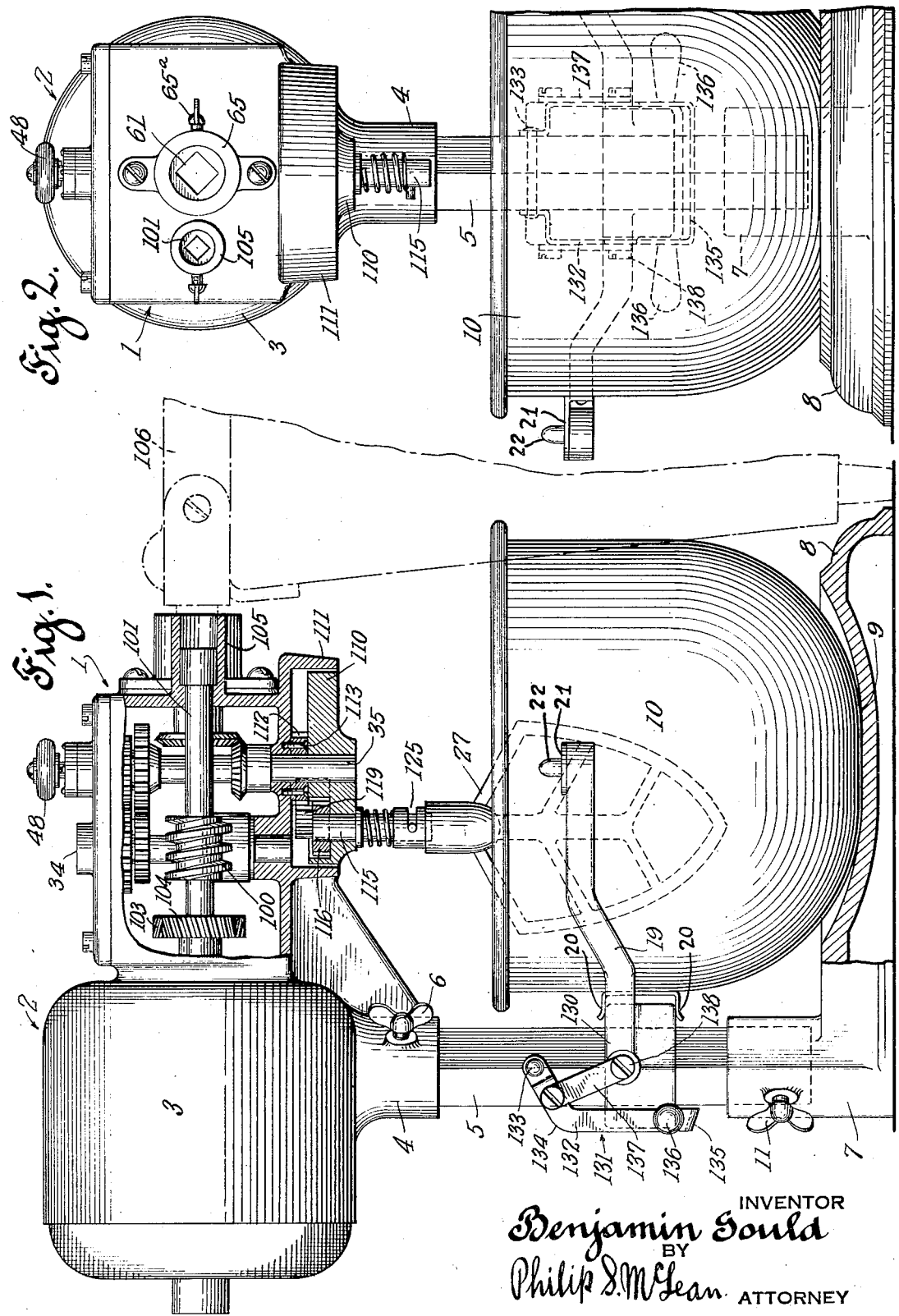
INVENTOR
Benjamin Gould
BY
Philip S. McLean  ATTORNEY

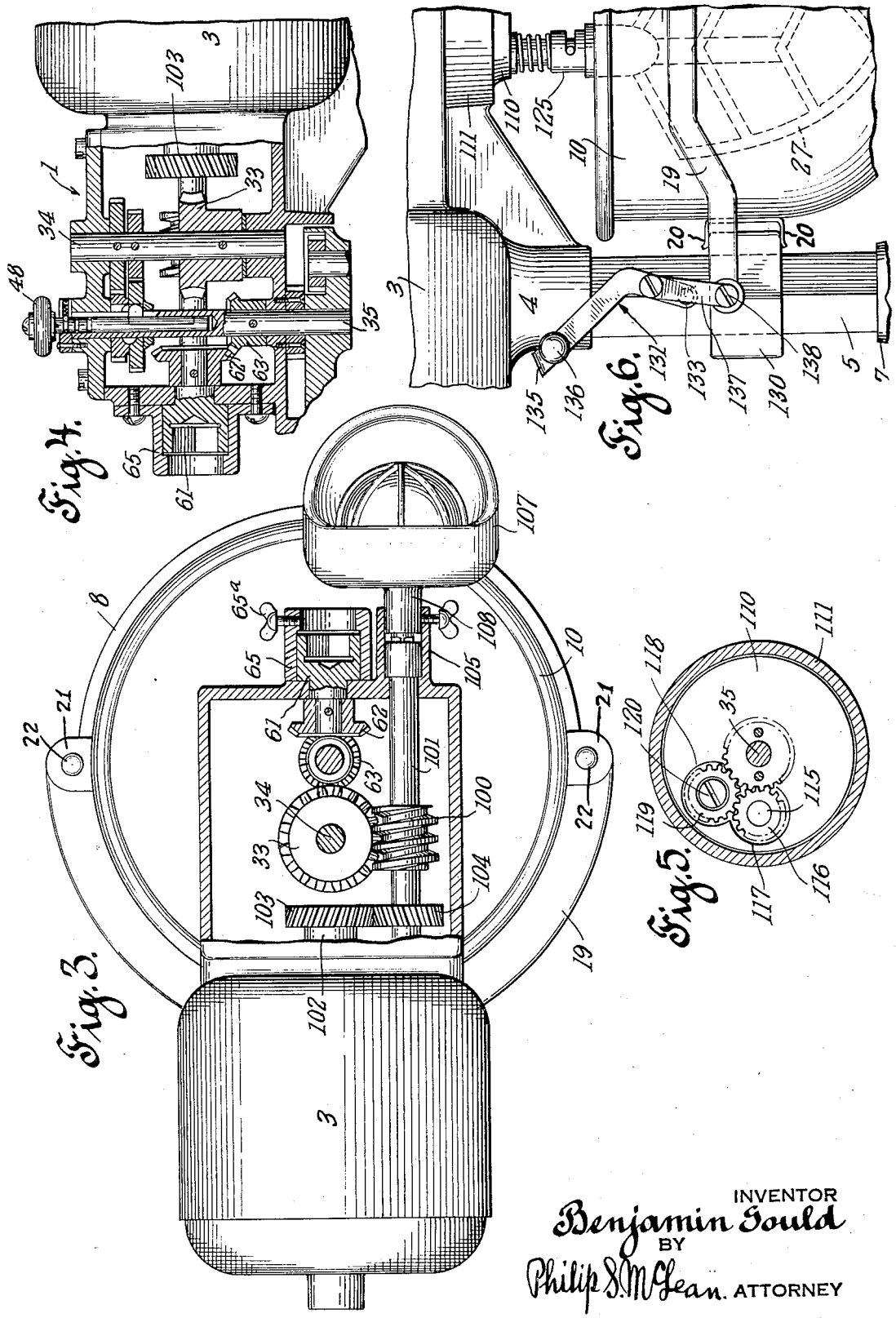

Patented Jan. 14, 1930

1,743,271

UNITED STATES PATENT OFFICE

BENJAMIN GOULD, OF BROOKLYN, NEW YORK, ASSIGNOR TO GEM APPLIANCES INC., OF NEW YORK, N. Y., A CORPORATION OF NEW YORK

ELECTRIC MIXER

Application filed September 20, 1928. Serial No. 307,100.

The invention relates to power driven apparatus for beating, mixing and analagous purposes; and its general objects are to provide an electrically operated machine which is of substantial but readily portable construction, simple in design and relatively inexpensive; which may be employed for a wide variety of uses and readily controlled in these various uses; and which may be readily taken apart and put together.

The invention is an improvement upon that disclosed in my pending application, Ser. No. 260,356 filed March 9, 1928, the improvements consisting principally in combining the motor as a unit with the gearing for driving the mixer and other devices which may be detachably connected thereto; in providing two distinct driving connections for devices or apparatus of different types in addition to the mixer or beater; in improved driving gearing for the mixer which makes its operation more effective, in novel and readily operated means for raising and lowering the bowl, and in various other features of construction or arrangement of parts, referred to hereafter.

The characteristics and advantages of the invention are further sufficiently explained in connection with the following detailed description of the accompanying drawings, which show a representative embodiment. After considering this example skilled persons will understand that many variations may be made without departing from the principles disclosed, and I contemplate the employment of any structures that are properly within the scope of the appended claims.

Fig. 1 is a side elevation of apparatus embodying the invention in one form, with some parts in section.

Fig. 2 is a front elevation (from the right of Fig. 1).

Fig. 3 is a top plan, with parts of the gearing omitted and other parts in section.

Fig. 4 is a vertical section of the gearing.

Fig. 5 is a horizontal detail section of the mixer driving gearing.

Fig. 6 is a fragmentary view similar to Fig. 1, showing the bowl held in elevated position by its operating device.

Driving and change-speed gearing contained in casing 1, and the general design or arrangement of the machine may be, except as noted hereafter, similar to that disclosed in the above-mentioned application. As an important improvement upon the previous structure I combine the motor with the gearing as a substantially self-contained unit. The motor shell or housing 3 is connected at one end to one wall of the gear case, or may be as shown, integral therewith. At the bottom of the motor casing is a boss 4 having therein a socket which is internally contoured to detachably receive the upper end of the polygonal supporting column or post 5, so that the motor and gearing may be mounted upon or removed from the post as a unit and when mounted may be firmly secured by a suitable clamp, such as the thumb screw 6. The lower end of the post is detachably mounted in a socket 7 in base 8 which has a pan formation 9 to receive the bottom of the bowl 10 when the latter is in lowered position. The post may be detachably secured in socket 7 by a suitable clamp such as the thumb-screw 11.

The transmission and change-speed gearing in case 1, as in the above mentioned application, includes vertical shafts 34 and 35, with intermediate gearing and mechanism under the control of hand knob 48 for driving shaft 35 at different speeds in relation to shaft 34, the controlling mechanism also having a neutral position in which shaft 35 is not driven. Shaft 34 is driven by a worm gear 33 and shaft 35 drives by means of bevel gears 63 and 62, a socketed shaft 61 which is revolubly mounted in one of the casing walls, the socket head revolving within a housing or collar 65 provided with a set screw 65ª for the mounting and driving connection of different tools or implements of suitable type, as referred to in the above mentioned application and hereinafter.

In the present construction, to provide for the driving of shaft 34 by an electric motor mounted as a unit with the gear casing, as shown, worm 100 for driving worm gear 33 is carried by a shaft 101 running in bearings in the casing and arranged parallel to the motor shaft 102 and the socketed shaft 61 above mentioned. Shaft 101 is driven from the motor shaft by suitable gears such as spiral gears 103 and 104 and these gears may when desired, be of different diameters to drive shaft 101 at different speeds in relation to shaft 102.

Shaft 101 has at its forward end, accessibly at the outside of the gear casing, a chuck 105 or other suitable device for detachably connecting a tool or implement to be driven, usually of a different type from the implements adapted for connection to the socketed shaft 61. Thus for example an ice cream freezer 106 as indicated by dotted lines in Fig. 1, or other desired appliance, may be connected to socketed shaft 61, and a fruit-juice extractor such as 107, Fig. 3, or a flexible or other drive shaft for operating a drill, buffer or other implement, may be connected to the chuck or socket 105 of shaft 101; and such implements may be connected to the motor and gearing when the latter is in position on post 5, or dismounted therefrom and located or supported in any convenient position.

Shaft 35 also, as in the above mentioned application, drives the stirring, beating or other analogous implement 27 located in bowl 10. In the present structure, however, I employ only a single implement driven by shaft 35 and arrange the driving mechanism so that this implement is rotated on its own axis in the direction opposite to the rotation of shaft 35, whereas in the above mentioned application the implement shafts are rotated on their own axes in the same direction as shaft 35. For this purpose a disc or rotor 110 is keyed or otherwise fixed on the lower end of shaft 35 and revolves within a circular wall or flange 111 at the bottom of the gear case. A pinion 112 is secured in fixed position, concentric with shaft 35 to the bottom wall of the case by screws 113 the pinion being apertured to accommodate the shaft. A spindle 115 is revolubly mounted in the disc 110, in offset or eccentric relation to shaft 35. A pinion 116 is secured on the upper end of spindle 115, the disc being recessed as at 117 to accommodate this pinion and also having a recess 118 to accommodate the lower portion of an idler pinion 119. Pinion 116, which may conveniently be identified as a planet pinion, does not directly engage the fixed pinion 112 as is the case in the application above referred to, but engages the lower portion of the teeth of idler pinion 119, while the upper portion of the idler teeth are in engagement with the teeth of pinion 112, the idler pinion having a face width sufficient to provide for the stated driving connection and vertical clearance between pinions 112 and 116, as clearly shown in Fig. 1. Idler pinion 119 is revolubly mounted on a stud shaft 120, the lower end of which is secured in the disc 110. The stirring implement 27 or any other analogous device which may be used interchangeably with it, is detachably secured on the lower end of shaft 115 by a quick-acting chuck 125 such for example as shown and described in the above mentioned application.

By the described driving connection, as disc 110 revolves, spindle 115 carrying the stirring implement moves about the center of shaft 35, thus traversing the implement in a circular path relatively near the wall of bowl 10. At the same time the idler gear 119 engaging the fixed pinion 112 is caused to rotate in the same direction as shaft 35, while pinion 116 and spindle 115 are caused to rotate about their own axis in the opposite direction; so that the portions of the stirring implement moving adjacent to the bowl wall move rearwardly in relation to the direction of movement of the spindle axis, while portions of the implement approaching the bowl center move in the opposite direction, thus providing an improved stirring effect and circulation of the material in the bowl.

The bowl 10 is detachably supported on a fork 19 as in the above mentioned application; but for the more convenient manipulation of the bowl, quickly operated means is provided for raising and lowering it as follows:

The fork 19 is connected to or formed integral with a hub 130 slidably mounted on post 5. A lever 131 which is in substantially yoke form, including arms 132 located at opposite sides of the post, has the ends of these arms pivotally mounted on a pin 133 passing through the post. The lever arms are bent as at 134 and are connected at their other ends by a cross piece 135, and one or more handles 136 are provided for convenient manipulation of the lever from either side of the machine. The bent arm portions are connected by links 137 to studs or trunnions 138 on hub 130. When the lever is in lower position, as shown in Fig. 1, the bowl is also lowered and may rest in pan 9 and can be easily removed by lifting it off of fork 19 after the stirring implement is removed. To raise the bowl to stirring position it is only necessary to move the lever to upward position as in Fig. 6, this movement causing the hub 130 to slide upward on the post and elevate the bowl, which is retained in elevated position by reason of the arrangement of the linkage, which is such that the weight of the bowl and connected parts tend to retain the lever in elevated position, with the cross piece 135 held against boss 4 of the motor casing.

While the bowl is readily detachable from the yoke, it will be noted that it is securely retained thereon and held against tipping by having spaced lugs 20 at the back of the same, engaging about the upper and lower edges of the back or sleeve portion of the yoke, Figures 1 and 6, when the perforated horizontal lugs or ears 21 at the sides of the bowl are engaged over the upstanding pointed pins 22 on the ends of the yoke. To remove, it is only necessary to lift the bowl sufficiently to clear the pins 22, whereupon the bowl may be directly withdrawn from the yoke. In replacing, the bowl is entered in the yoke so as to first engage the lugs 20 with the back of the yoke and then as the bowl is lowered to carry the perforated ears down over the pins, the same becomes interlocked with the yoke so that there is no possibility of its tipping or accidental removal.

The arrangement of the motor in the motor casing 3 at the back of and directly in line with the gear case 1 provides a low, compact structure in which the weight of the motor substantially balances the weight of the gearing. The machine, therefore, takes up very little room and can be placed in or on a cabinet, where there is but small overhead space. The location of the two power take-offs at the front of the machine is also a distinct advantage, enabling the buffer, fruit reamer, ice cream freezer, food chopper or the like to be quickly connected or disconnected, entirely clear of the beater mechanism. The sockets 65 and 105, Figures 1, 2 and 3, provide stationary supports or holders for these various devices when the shaft portions of the same are coupled up with the driving clutches 61 or 101 of the take-offs, insuring a positive driving relation of such parts and preventing accidental uncoupling when in use.

I claim:

1. In apparatus of the character disclosed, a supporting yoke having upstanding pins at the ends of the same, a bowl received in said yoke and having perforated ears at the sides of the same for engagement over said pins and spaced lugs at the back of the bowl engageable about the upper and lower edges of the back portion of the yoke for holding the bowl against tipping when engaged on the pins aforesaid.

2. In apparatus of the character disclosed, a supporting yoke, disengageable pin and lug connections between the sides of the bowl and the ends of the yoke and interlocking connections between the back of the bowl and the back of the yoke for holding the bowl against tipping when the bowl is supported by the pin and lug connections at the sides of the bowl, said interlocking connections at the back being disengageable when the bowl is withdrawn from the yoke after being first lifted sufficiently to disengage the pin and lug connections at the sides of the bowl.

3. Apparatus of the character herein disclosed, comprising a base, a supporting post rising from said base, a bowl holder projecting from the post above the base, a bowl positioned by said holder over the base, a motor casing mounted in horizontally extending relation on top of said post and having a gear case extending from said motor case at one side of the supporting post over the base aforesaid, a motor set in the opposite side of said motor casing and having a horizontally disposed motor shaft extending toward the gear case, said motor being disposed in the motor casing to the opposite side of the supporting post from the gear case and transmission gearing from the motor shaft in the gear case and including drive mechanism constituting a power take-off exposed through the front wall of the gear case substantially at the level of the motor shaft and a drive for a tool below the bottom of the gear case over the base and in line with the bowl and whereby the motor and gear case are in horizontally aligned relation, compactly arranged over the base with clearance between the bottom of the gear case and the rim of the bowl and with the power take-off in substantially horizontal alignment with the motor, but at the side of the base opposite that side where the motor is located.

4. Apparatus of the character herein disclosed, comprising a base, a supporting post rising from said base, a bowl holder projecting from the post above the base, a bowl positioned by said holder over the base, a motor casing mounted in horizontally extending relation on top of said post and having a gear case extending from said motor case at one side of the supporting post over the base aforesaid, a motor set in the opposite side of said motor casing and having a horizontally disposed motor shaft extending toward the gear case, said motor being disposed in the motor casing to the opposite side of the supporting post from the gear case and transmission gearing from the motor shaft in the gear case and including drive mechanism constituting a power take-off exposed through the front wall of the gear case substantially at the level of the motor shaft and a drive for a tool below the bottom of the gear case over the base and in line with the bowl and whereby the motor and gear case are in horizontally aligned relation, compactly arranged over the base with clearance between the bottom of the gear and the rim of the bowl and with the power take-off in substantially horizontal alignment with the motor, but at the side of the base opposite that side where the motor is located, the said motor casing having a socketed mounting on the supporting post adjacent the junction of the motor casing with the gear case and means being provided for removably securing said combined motor casing and gear case on the supporting post, whereby said motor casing and gear case complete may be quickly removed as a single unit from the post and base independently of the bowl holder.

In testimony whereof I affix my signature.

BENJAMIN GOULD.